United States Patent
Tuma

(10) Patent No.: US 7,581,585 B2
(45) Date of Patent: Sep. 1, 2009

(54) VARIABLE POSITION COOLING APPARATUS

(75) Inventor: Phillip E. Tuma, Faribault, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 542 days.

(21) Appl. No.: 10/977,448

(22) Filed: Oct. 29, 2004

(65) Prior Publication Data

US 2006/0102334 A1     May 18, 2006

(51) Int. Cl.
    *F28F 27/00*     (2006.01)
(52) U.S. Cl. .................. 165/276; 165/46; 165/80.2; 165/104.11; 165/104.19; 165/104.28
(58) Field of Classification Search .................. 165/276, 165/10, 46, 80.2, 80.1, 80.5, 104.11, 104.19, 165/104.28
    See application file for complete search history.

(56) References Cited

U.S. PATENT DOCUMENTS

| | | | |
|---|---|---|---|
| 3,741,292 A | 6/1973 | Aakalu et al. |
| 4,024,991 A | 5/1977 | Tyson et al. |
| 4,092,697 A | 5/1978 | Spaight |
| 4,203,129 A | 5/1980 | Oktay et al. |
| 4,330,033 A | 5/1982 | Okada et al. |
| 4,563,375 A | 1/1986 | Ulrich |
| 4,799,537 A | 1/1989 | Hoke, Jr. |
| 5,000,256 A | 3/1991 | Tousignant |
| 5,006,924 A | 4/1991 | Frankeny et al. |
| 5,139,666 A | 8/1992 | Charbonneau et al. |
| 5,257,755 A | 11/1993 | Moser et al. |
| 5,383,340 A | 1/1995 | Larson et al. |
| 5,411,077 A | 5/1995 | Tousignant |
| 5,458,189 A | 10/1995 | Larson et al. |
| 5,485,671 A | 1/1996 | Larson et al. |
| 5,582,242 A | 12/1996 | Hamburgen et al. |
| 5,621,613 A | 4/1997 | Haley et al. |
| 5,634,351 A | 6/1997 | Larson et al. |
| 5,647,416 A | 7/1997 | Desrosiers et al. |
| 5,661,637 A | 8/1997 | Villaume |
| 5,704,416 A | 1/1998 | Larson et al. |
| 5,718,282 A | 2/1998 | Bhatia et al. |
| 5,720,338 A | 2/1998 | Larson et al. |
| 5,814,392 A | 9/1998 | You et al. |
| 5,940,270 A | 8/1999 | Puckett |
| 5,982,616 A | 11/1999 | Moore |

(Continued)

FOREIGN PATENT DOCUMENTS

DE     204149 A     11/1983

(Continued)

OTHER PUBLICATIONS http://www.thefreedictionary.com/end, The Free Dictionary by Farlex, defintion for "end".*

(Continued)

*Primary Examiner*—Ljiljana (Lil) V Ciric
(74) *Attorney, Agent, or Firm*—Johannes P. M. Kusters

(57) ABSTRACT

A device for cooling a heat-dissipating component, including an expansion chamber that is expandable between a first volume and a second volume. The expansion chamber adjusts its surface exposure to ambient air according to the operating conditions of the device.

36 Claims, 5 Drawing Sheets

U.S. PATENT DOCUMENTS

| | | | |
|---|---|---|---|
| 6,032,812 A | 3/2000 | Lamoureux | |
| 6,175,493 B1 | 1/2001 | Gold | |
| 6,388,882 B1 | 5/2002 | Hoover et al. | |
| 6,466,438 B1 | 10/2002 | Lim | |
| 6,622,782 B2 | 9/2003 | Malhammar | |
| 6,690,578 B2 | 2/2004 | Edelmann | |
| 6,786,330 B2 | 9/2004 | Mollstam et al. | |
| 7,086,430 B2 | 8/2006 | Walton | |
| 7,240,720 B2 * | 7/2007 | Noel | 165/46 |
| 2002/0080583 A1 | 6/2002 | Prasher et al. | |
| 2003/0011983 A1 | 1/2003 | Chu et al. | |
| 2003/0013923 A1 | 1/2003 | Marchionni et al. | |
| 2003/0136550 A1 | 7/2003 | Tung et al. | |
| 2003/0232463 A1 | 12/2003 | Davidson | |

FOREIGN PATENT DOCUMENTS

| | | |
|---|---|---|
| DE | 100 51 338 A1 | 4/2002 |
| EP | 0 309 279 A1 | 3/1989 |
| EP | 0 571 863 A1 | 12/1993 |
| EP | 0 644 592 A1 | 3/1995 |
| EP | 1 020 912 A1 | 7/2000 |
| EP | 1 276 149 A2 | 1/2003 |
| FR | 2 413 624 | 7/1979 |
| JP | 60117760 A | 6/1985 |
| JP | 4002156 A | 1/1992 |
| JP | 5090456 | 4/1993 |
| JP | 8055701 A | 2/1996 |
| JP | 2000031360 A | 1/2000 |
| JP | 2002 020737 | 1/2002 |
| JP | 2002310581 A | 10/2002 |
| JP | 2003068636 A | 3/2003 |
| WO | WO 02/19424 A2 | 3/2002 |

OTHER PUBLICATIONS

Article: Tetzeli, "Plumbing for PCs," *Fortune*, Information Technology-Quarterly Report, Dec. 27, 1993, 1 page.

Article: Staudter, "Cooling Off Hot Laptops," *Think Research*, Mar. 31, 2004, pp. 1-4.

* cited by examiner

VARIABLE POSITION COOLING APPARATUS

BACKGROUND

As electronic systems become more compact, there is a continuing desire to increase the rate of heat transfer away from heat-dissipating components. With many heat transfer techniques considered for compact devices, it is difficult to provide sufficient cooling for components within the available space inside the device.

Although forced air convection has been used in small electronic devices, such as, for example, laptop computers, forced air convection methods have practical limits. The amount of air required to provide sufficient cooling in a forced air convection system generally creates an undesirable noise level and can consume battery life in portable devices.

Another method for cooling heat-dissipating components involves the use of fluids in a thermal transfer bag. Thermal transfer bags are generally made from flexible, durable, and air-impermeable films. The bags are filled with a thermally conductive fluid and are generally placed between a heat-generating component and the environment.

Although thermal transfer bags have been used in some cooling systems, the use of thermal transfer bags in small electronic devices, such as, for example, laptop computers has been limited, at least in part, because of the limited amount of available space within the chassis of the computer and their surface area requirements for effective cooling. Accordingly, there is a continuing need to provide inexpensive, quiet, and effective cooling systems for cooling small electronic devices that minimize the use of space within the device.

SUMMARY

The present invention relates generally to a device for cooling electronic components, and more particularly, to a device that adjusts its surface exposure to ambient air according to the operating conditions of the device. In one aspect, the device functions as thermosyphon.

In one aspect of the present invention, the variable position cooling apparatus comprises a substrate and an expansion chamber having at least one sidewall that is substantially impermeable to fluid. The sidewall defines an enclosed volume that is expandable between a first volume and a second volume. The second volume can be the volume of the expansion chamber when it is fully opened, or any other volume between the closed volume and the fully open volume. The sidewall also has a proximal end affixed to the substrate, a distal end opposite the proximal end, an inner surface proximate the enclosed volume, and an outer surface opposite the inner surface. A quantity of heat transfer fluid is disposed within said enclosed volume and the distal end moves from a first position proximate the substrate to a second position as the enclosed volume expands from the first volume to the second volume.

In some embodiments, a plurality of expansion chambers are used to form the variable position cooling apparatus. In yet further embodiments, a movable member is affixed to the distal ends of the plurality of expansion chambers. In some embodiments, a biasing element cooperates with the substrate and the movable member to force the distal end to be proximate the substrate at said first volume of said expansion chamber.

In some embodiments, the distal end of the sidewall is at least 1 centimeter away from the substrate in the second position. In other embodiments, the distal end of the sidewall is at least 1 centimeter away from the substrate in the second position. In yet further embodiments, the distal end is at least 5 centimeters away from the substrate in said second position.

In some embodiments of the present invention, the sidewall of the expansion chamber has a corrugated portion. The sidewall of the expansion chamber can also include an area adaptable for displaying a graphic. The graphic becomes visible when the enclosed volume is at said second volume. The graphic is concealed when the enclosed volume is at the first volume. In some embodiments, the sidewall of the expansion chamber comprises a geometric shape that is visible when the enclosed volume is at the second volume.

In some aspects of the present invention, the expansion chamber is in fluid communication with the heat-dissipating component. In some embodiments, the heat transfer fluid used in the expansion chamber comprises at least one of a perfluorocarbon, hydrofluorocarbon, hydrofluoroether, and perfluoroketone.

In some embodiments of the present invention, the sidewall of the expansion chamber comprises at least one of a polymer film, a metal foil, and a multilayer barrier film.

The variable position cooling apparatus of the present invention can be attached to a computer chassis. The variable position cooling apparatus of the present invention can also be used as a component in a larger cooling system.

In some embodiments, the variable position cooling apparatus comprises a substrate, a movable member that is movable between a first position and a second position, and an expansion chamber. The expansion chamber has a proximate end affixed to the substrate and a distal end affixed to the movable member. The expansion chamber is filled with a quantity of heat transfer fluid. The movable member moves between the first position and the second position as the vapor pressure of the heat transfer fluid changes.

The present invention also provides methods for cooling a heat-dissipating component. The method includes providing an expansion chamber comprising a quantity of heat transfer fluid and at least one sidewall that is substantially impermeable to fluid. The sidewall defines an enclosed volume that is expandable between a first volume and a second volume. The vapor pressure of the heat transfer fluid is increased by heating the heat transfer fluid. The increased vapor pressure causes the sidewall to move as the expansion chamber expands from the first volume to the second volume.

These figures, which are idealized, are not to scale and are intended to be merely illustrative of the present invention and non-limiting.

DETAILED DESCRIPTION

Figure 1A:
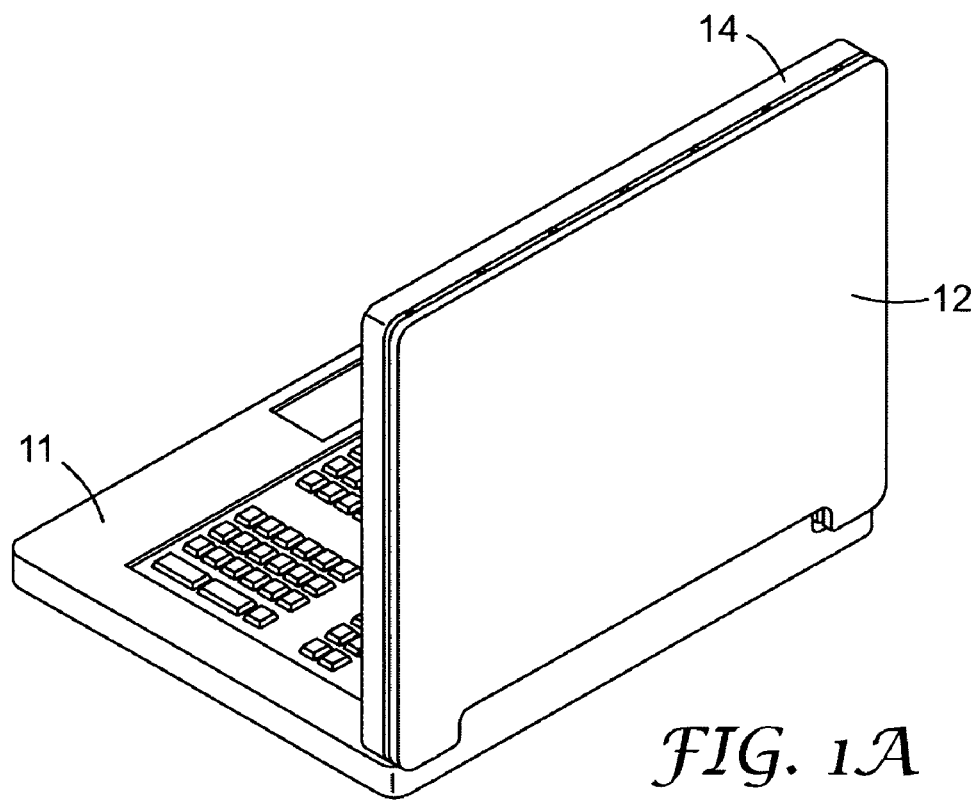
FIG. 1A is a perspective view of an exemplary embodiment of the present invention in a closed position.

FIG. 1A shows a perspective view of an exemplary embodiment of the present invention positioned on a laptop computer. As shown in FIG. 1A, a movable member 12 is connected to a substrate 14. The substrate 14 is the backside of the viewing screen of the laptop computer 11. In FIG. 1A, the movable member 12 is shown in a closed position wherein the movable member 12 is proximate the substrate 14.

Figure 1B:
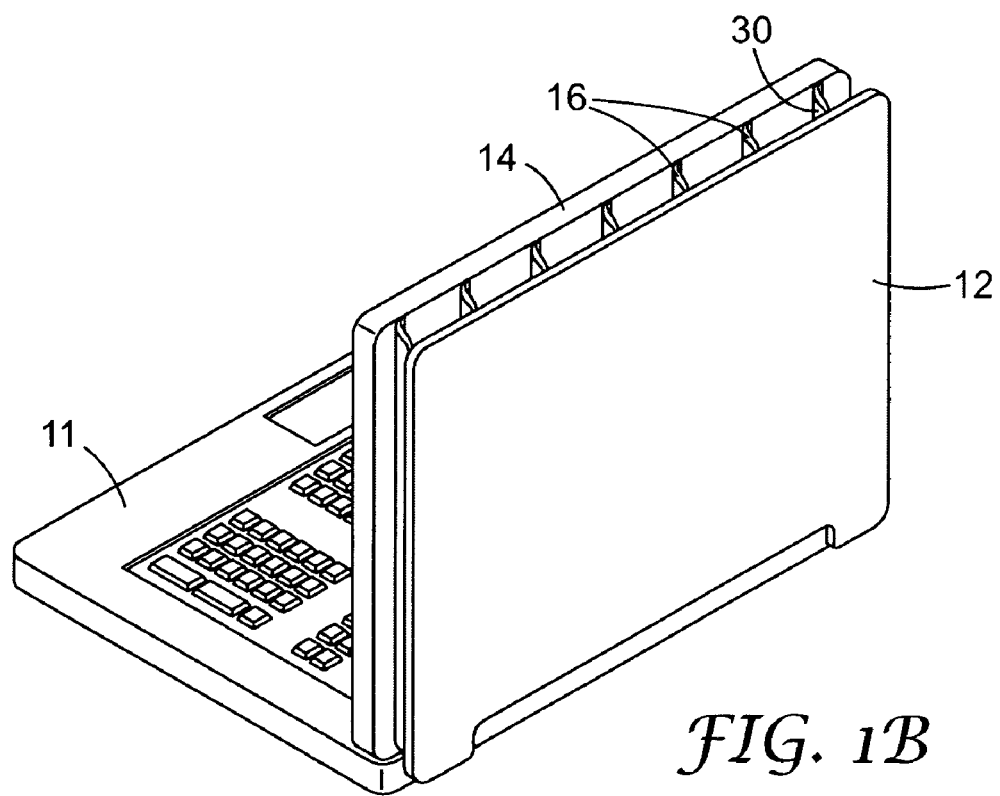
FIG. 1B is a perspective view of the exemplary embodiment shown in FIG. 1A in the open position.

FIG. 1B shows a perspective view of the exemplary embodiment shown in FIG. 1A with the movable member 12 shown in an open position wherein the movable member 12 is positioned a distance from substrate 14. Also shown in FIG. 1B is a heat transfer bag 30 having a plurality of expansion chambers 16 connecting the movable member 12 to the substrate 14. A change in pressure within the expansion chambers 16 causes the movable member 12 to move relative to the substrate 14. The movable member 12 generally moves toward the substrate 14 as pressure within the expansion chambers 16 is reduced. Likewise, the movable member 12 generally moves away from the substrate 14 as pressure within the expansion chambers 16 is increased.

In some embodiments, the distance between the movable member and the substrate in the closed position is less than about 1 centimeter. In other embodiments, the distance between the movable member and the substrate in the closed position is less than about 0.5 centimeter. In yet further embodiments, the distance between movable member and the substrate in the closed position is less than about 0.2 centimeter.

In some embodiments, the distance between the movable member and the substrate in an open position is more than about 1 centimeter. In other embodiments, the distance between the movable member and the substrate in an open position is more than about 2 centimeters. In yet further embodiments, the distance between movable member and the substrate in an open position is more than about 5 centimeters.

Figure 2A:
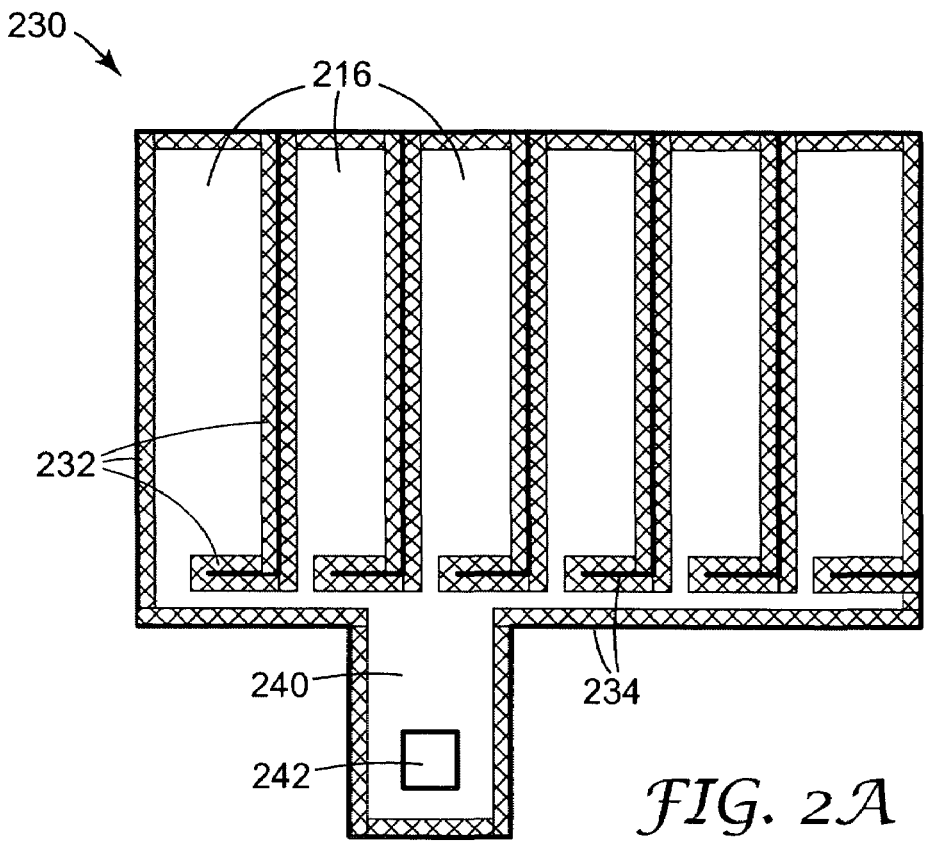
FIG. 2A is a cross-sectional view of an exemplary heat transfer bag of the present invention.

FIG. 2A is a cross-sectional view of an exemplary heat transfer bag of the present invention. As shown in FIG. 2A, the heat transfer bag 230 comprises a plurality of expansion chambers 216. Sealing two films together forms the expansion chambers 216. Each expansion chamber 216 has a seal 232 and cut line 234 around a majority of the perimeter of the expansion chamber 216.

Figure 2B:
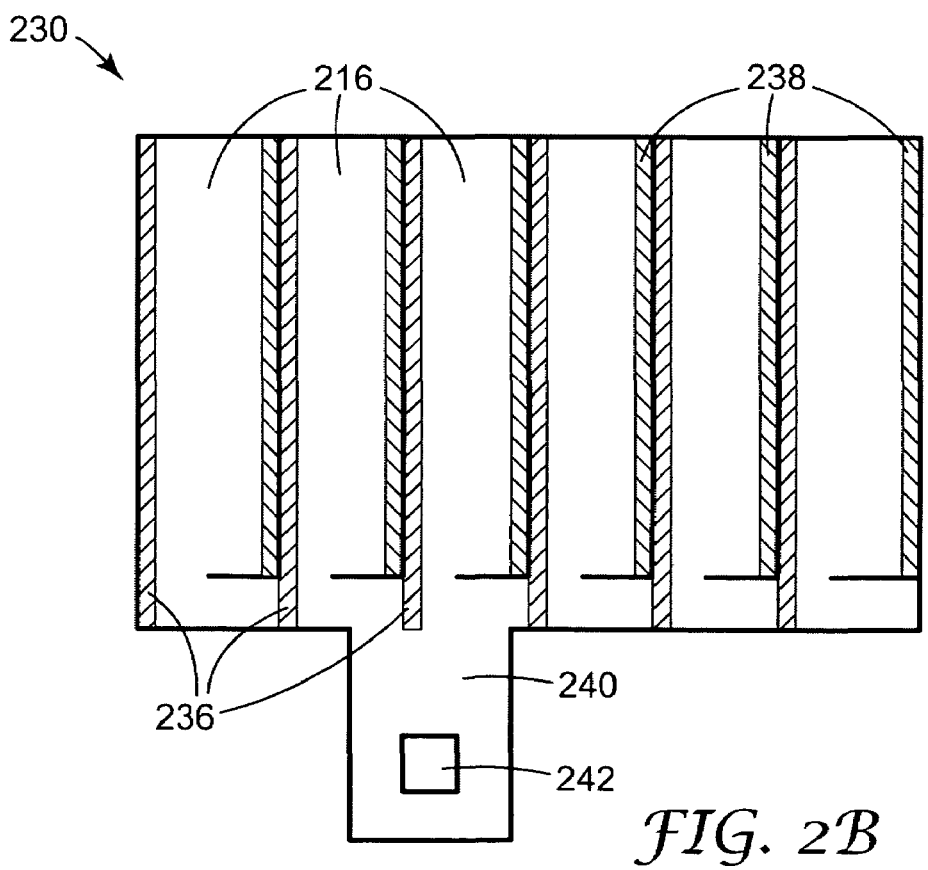
FIG. 2B is a cross-sectional view of the exemplary heat transfer bag shown in FIG. 2A showing attachment interface areas.

FIG. 2B is a cross-sectional view of the exemplary heat transfer bag shown in FIG. 2A showing attachment interface areas. The substrate attachment interface 236 is located on one side of the heat transfer bag 230 and affixes a portion of each expansion chamber to the substrate. The movable member attachment interface 238 is located on the opposite side of the heat transfer bag 230 and affixes a portion of each expansion chamber to the movable member. The attachment interfaces 236, 238 can be affixed to the substrate 214 and movable member 212 with adhesive, mechanical fasteners, welding, or any other means known to those skilled in the art. In certain embodiments, the substrate attachment interface 236 and the movable member attachment interface 238 comprise a double-sided adhesive tape.

Materials suitable for use as the sidewall of heat transfer bag include, for example, metal foils, plastic, polymeric films, and multilayer barrier films such as those commonly used in food packaging, particularly those lined with a polyamide or polyimide.

The term multilayer barrier film refers to any combination of metal, plastic, or cellulosic layers (e.g., foils, films, and paper). The combination of metal, plastic, or cellulosic layers can include multiple layers of different materials, such as, for example, a metal combined with a plastic layer. The combination of metal, plastic, or cellulosic layers can also include multiple layers of similar materials, such as, for example, two layers of plastic.

Multilayer barrier films useful in the present invention include multilayer films with layers that are affixed to one another, for example, by coating, laminating, coextrusion, or deposition. Multilayer barrier films useful in the present invention can comprise layers of low-density polyethylene, high-density polyethylene, polypropylene, polyester, nylon, polyethylene-co-vinyl acetate, polyvinylidene chloride, polyamide, or polyimide. In some embodiments, a multilayer barrier composite having a layer of metal, such as, for example, aluminum is used. Multilayer barrier films and other films useful for the sidewall of the present invention are described in U.S. Pat. No. 4,997,032 (Danielson et al.) and U.S. Pat. No. 5,411,077 (Tousignant), incorporated by reference.

In some embodiments, the heat transfer bag is welded to form the seal 232. In other embodiments, seal 232 is formed with adhesive or a mechanical fastener. Other suitable methods for sealing films known to those skilled in the art can also be employed.

A quantity of heat transfer fluid is disposed within the heat transfer bag 230 prior to completely sealing the heat transfer bag. The heat transfer fluid useful in the present invention can be any fluid capable of transferring heat, including water, volatile fluids, such as, for example, alcohols, and electronic cooling fluids known to those skilled in the art. In certain embodiments, the heat transfer fluid is dielectric, non-flammable, and provides a significant vapor pressure at the operating temperature of the heat-dissipating component.

In certain embodiments, the heat transfer fluid is thermally conductive, chemically inert, essentially gas-free, and thermally stable. In other embodiments, the heat transfer fluid has a boiling point that is at or below the operating temperature of the heat-dissipating component such that portions of the liquid adjacent the heat-dissipating component will vaporize when conducting heat. The heat transfer fluid can be selected from the representative class of fluorinated linear, branched or cyclic alkanes, ethers, ketones, tertiary amines, and aminoethers, and mixtures thereof. In some embodiments, perfluorinated fluids are used in this invention, though partially fluorinated fluids can also be used. The perfluorinated fluids can be straight chain, branched chain, cyclic, or a combination thereof. In some embodiments, the perfluorinated fluids can be saturated, that is, free of ethylenic, acetylenic, and aromatic unsaturation. The skeletal chain can include catenary oxygen and/or trivalent nitrogen heteroatoms providing stable links between fluorocarbon groups and not interfering with the inert character of the compound. In some embodiments, hydrofluoroethers, either segregated or non-segragated are used. In other embodiments, perfluorinated ketones are used.

Representative examples of suitable fluorinated fluids or mixtures thereof useful for the present invention are commercially available from 3M Company, St. Paul, Minn., and marketed under various trade designations, including, for example, "3M BRAND FLUORINERT ELECTRONIC LIQUIDS" and "3M BRAND NOVEC ENGINEERED FLUIDS", described in 3M Company product bulletin No. 98-0212-2249-7, issued January 2003. Other commercially available fluorochemicals useful in the present invention are those available from Solvay Solexis S.p.A, Bollate, Italy, under the trade designation "GALDEN PFPE: HEAT TRANSFER FLUIDS" and their hydrofluoroethers available under the trade designation "H-GALDEN ZT HEAT TRANSFER FLUID". Heat transfer fluids useful in the present invention also include hydrofluorocarbon compounds such as those sold under the trade designations "VERTREL SPECIALTY FLUIDS" and "SUVA REFRIGERANTS" available from DuPont, Wilmington, Del.

Also shown in FIGS. 2A and 2B is a reservoir 240 within the heat transfer bag 230. The reservoir 240 is in fluid communication with the expansion chambers 216. Within the reservoir 240, is a thermal via 242. The thermal via 242 can be metallic and can be used to enhance the transfer of heat from a heat-dissipating component to the heat transfer fluid within the heat transfer bag 230. Thermal vias useful for the heat transfer bag of the present invention are described in U.S. Pat. No. 5,000,256 (Tousignant), incorporated by reference.

Reservoir 240 can be used as a conduit between the expansion chamber and the heat-dissipating component. In other embodiments, a fluid conduit external to the heat transfer bag, such as, for example, a pipe or tube, is affixed to the heat transfer bag. In yet further embodiments, a combination of a reservoir within the heat transfer bag and a fluid conduit external to the heat transfer bag is used between the expansion chamber and the heat-dissipating component. In another embodiment, a plurality of expansion chambers are independently connected by a common manifold and are in fluid communication with one another.

The heat dissipating component cooled with the present invention can be a semiconductor, such as, for example, a central or graphics processing unit, an insulated gate bipolar transistor (IGBT), memory module, or an application specific integrated circuit (ASIC). In other embodiments, the heat dissipating component can be a hard disk drive, power supply, transformer, laser diode array, light emitting diode (LED) array, halogen bulb, or any other heat-dissipating component known to those skilled in the art. The heat dissipating component can also be a non-heat generating structure, such as, for example, an integrated heat spreader (IHS) that is connected to a heat-generating device, such as, for example, a semiconductor.

Figure 3A:
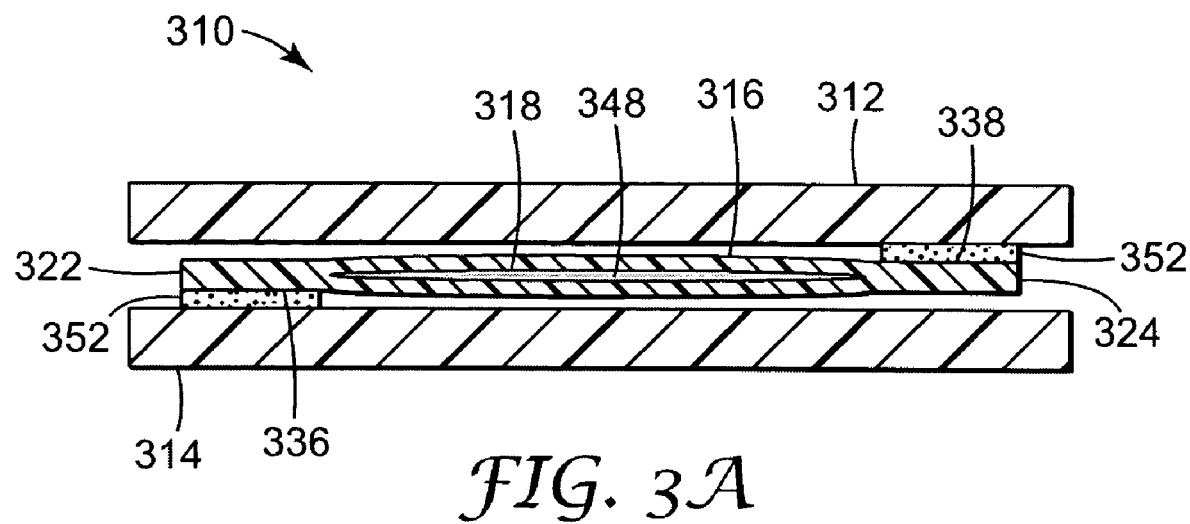
FIG. 3A is a cross-sectional view of an exemplary embodiment of the present invention in the closed position.

FIG. 3A is a cross-sectional view of an exemplary embodiment of the present invention in the closed position. As shown in FIG. 3A, an expansion chamber 316 is positioned between a substrate 314 and a movable member 312. The expansion chamber 316 comprises a sidewall 318 that defines an enclosed volume. A quantity of heat transfer fluid 348 is disposed within the enclosed volume.

The expansion chamber 316 has a proximal end 322 with a substrate attachment interface 336 affixed to the substrate 314. The expansion chamber 316 also has a distal end 324 with a movable member attachment interface 338 affixed to the movable member 312. The attachment interfaces 336, 338 of the proximal and distal ends 322, 324 can be affixed using an adhesive 352.

Figure 3B:
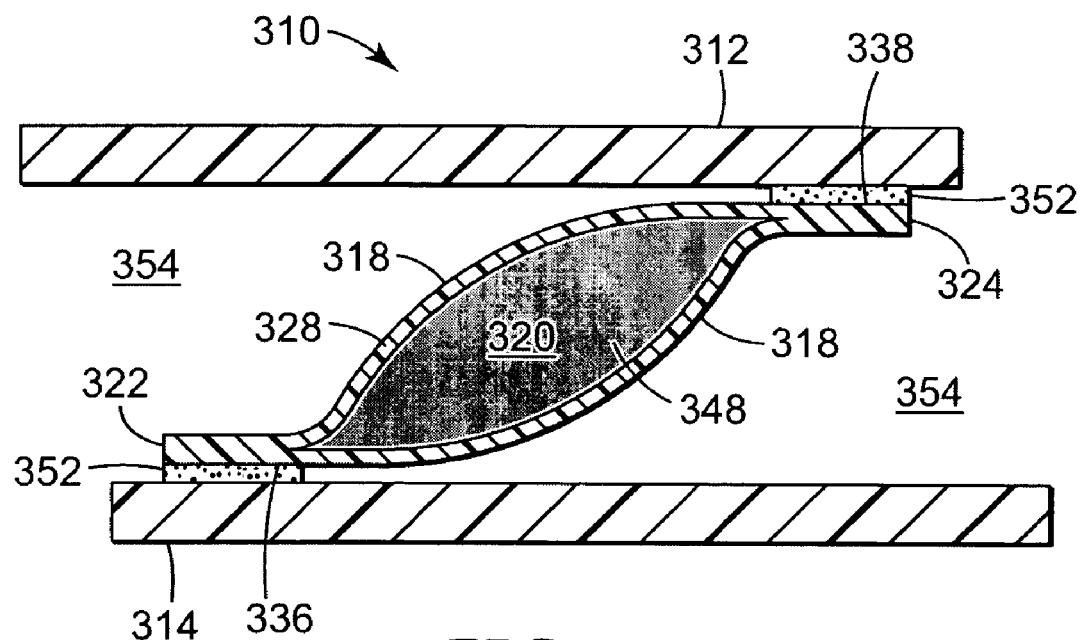
FIG. 3B is a cross-sectional view of the exemplary embodiment shown in FIG. 3A in an open position.

FIG. 3B is a cross-sectional view of the exemplary embodiment shown in FIG. 3A in an open position. As shown in FIG. 3B, the distal end 324 of the expansion chamber 316 has moved away from the substrate 314. The movement of the expansion chamber 316, in turn, has caused the movable member 312 to move away from the substrate 314. In doing so, the outer surface 328 of the sidewall 318 is exposed to ambient air 354 surrounding the cooling assembly 310.

The level of exposure of the side 318 to the ambient air 354 varies with pressure within enclosed volume 320. When the pressure in the enclosed volume 320 is low (e.g., the heat-dissipating component is operating at low power), the cooling assembly 310 will close as shown in FIG. 3A and the outer surface 328 of the sidewall 318 will be substantially insulated from ambient air 354. As the pressure in the enclosed volume 320 is increased (e.g., the heat-dissipating component is operating at low power), the cooling assembly 310 will open as shown in FIG. 3B and the outer surface 328 of the sidewall 318 will be exposed to ambient air 354 surrounding the cooling apparatus 310. Likewise, as the pressure in the enclosed volume 320 is decreased (e.g., the heat-dissipating component is operating at low power), the cooling assembly 310 will return to the closed position.

In some embodiments, the sidewall is convectively cooled. In certain embodiments, the sidewall, the substrate, and the moveable member form a channel that permits buoyancy driven convection. In yet further embodiments, forced air may be used to further cool the sidewall.

In addition to increasing the exposed surface of the sidewall as the expansion chamber expands from a closed position to an open position, the exposed surface areas of the substrate and moveable member generally increase as the expansion chamber opens. The increased surface area exposure of the substrate or movable member can be used to provide additional cooling surfaces.

In certain embodiments, the type and quantity of heat transfer fluid is selected to create a pressure in the enclosed volume of the expansion chambers that causes the expansion chambers to fully open when the heat-dissipating component is operating at high power. In other embodiments, the type and quantity of heat transfer fluid is selected to create a pressure in the enclosed volume of the expansion chambers that causes the expansion chambers to fully open at the maximum operating power of the heat-dissipating device under expected environmental conditions.

In some embodiments, a biasing element (not shown) cooperates with the substrate and the movable member to create a force on the movable member toward the substrate. The biasing element can comprise a spring, elastic material, or any other mechanism known to those skilled in the art for applying a retractive force. In some embodiments, the biasing member is a spring connecting the substrate and the movable member. The retractive force of the biasing member assists the movable member in moving from an open position to a closed position. In some embodiments, the retractive force of the biasing element is selected to allow the expansion chamber to fully open at the normal operating temperature of the heat-dissipating device.

Figure 4A:
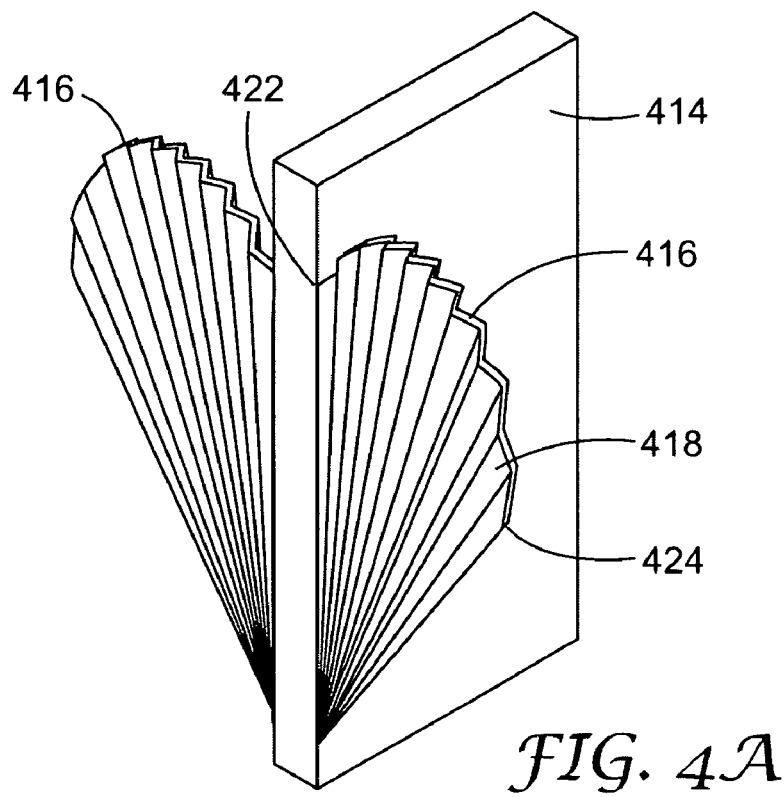
FIG. 4A is a perspective view of an exemplary embodiment of the present invention in an open position displaying a heart shape.
Figure 4B:
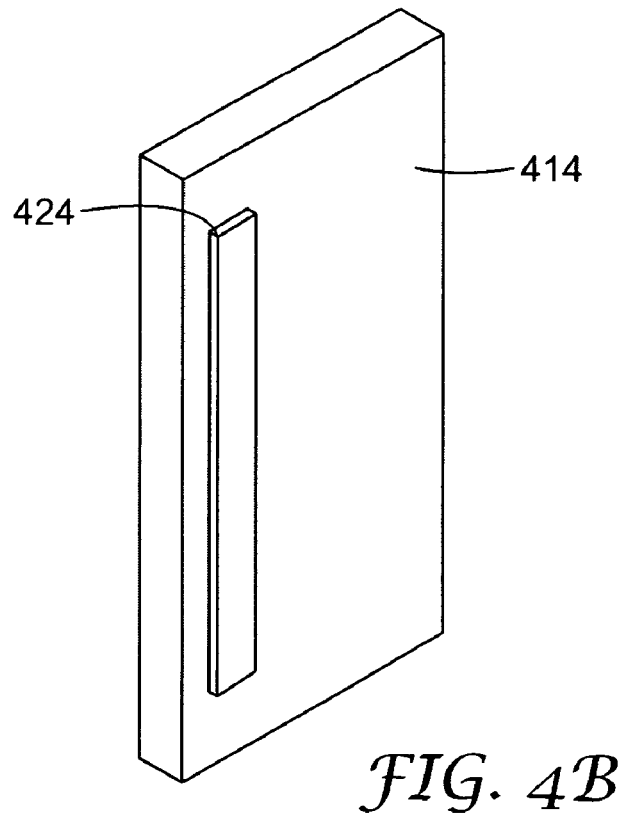
FIG. 4B is a perspective view of the exemplary embodiment shown in FIG. 4A in the closed position.

FIG. 4A is a perspective view of an exemplary embodiment of the present invention in an open position displaying a heart shape. FIG. 4B is a perspective view of the exemplary embodiment shown in FIG. 4A in the closed position. As shown in FIG. 4A, two expansion chambers 416 are mounted on opposing sides of a substrate 414. The substrate 414 can be any member that allows the expansion chambers to be in thermal communication with a heat-dissipating device. In some embodiments, the substrate is a portion of a computer chassis, such as, for example, the backside of the screen portion of a laptop computer or the sidewall of a desktop. In other embodiment, the substrate can be a sidewall of a monitor or the sidewall of a monitor support member.

The expansion chambers 416 shown in FIG. 4A have a sidewall 418 that is generally corrugated. The expansion chamber 416 defines an enclosed volume and has a proximal end 422 affixed to the substrate 414 and a distal end 424. As shown in FIG. 4A, in an open position, the distal end 424 of the expansion chamber 416 is a distance away from the substrate. As shown in FIG. 4B, in a closed position, the distal end 424 of the expansion chamber 416 is proximate the substrate.

In some embodiments, the distance between the distal end and the substrate in the closed position is less than about 1 centimeter. In other embodiments, the distance between the distal end and the substrate in the closed position is less than about 0.5 centimeter. In yet further embodiments, the distance between distal end and the substrate in the closed position is less than about 0.2 centimeter.

In some embodiments, the distance between the distal end and the substrate in an open position is more than about 1 centimeter. In other embodiments, the distance between the distal end and the substrate in an open position is more than about 2 centimeters. In yet further embodiments, the distance between distal end and the substrate in an open position is more than about 5 centimeters.

In some embodiments, the sidewall of the expansion chamber is undulated and forms a corrugated pattern with substantially flat surfaces. The corrugated sidewall allows the expansion chamber to be collapsed in an accordian-like fashion. In other embodiments, the sidewall of the expansion chamber forms a corrugated pattern with curvilinear surfaces that form a scallop-type pattern. In some embodiments, the undulations of a sidewall are substantially constant over the width of the sidewall. In other embodiments, the undulations vary and may appear larger or smaller near the substrate relative to the undulations near the distal end of the expansion chamber In yet further embodiments, the sidewall of the expansion chamber forms a roll that is coiled in the closed position and at least partially unrolls to expose a portion of the sidewall to ambient air. Other collapsible geometric configurations known in the art can also be used to form the sidewall of the expansion chamber.

Figure 5:
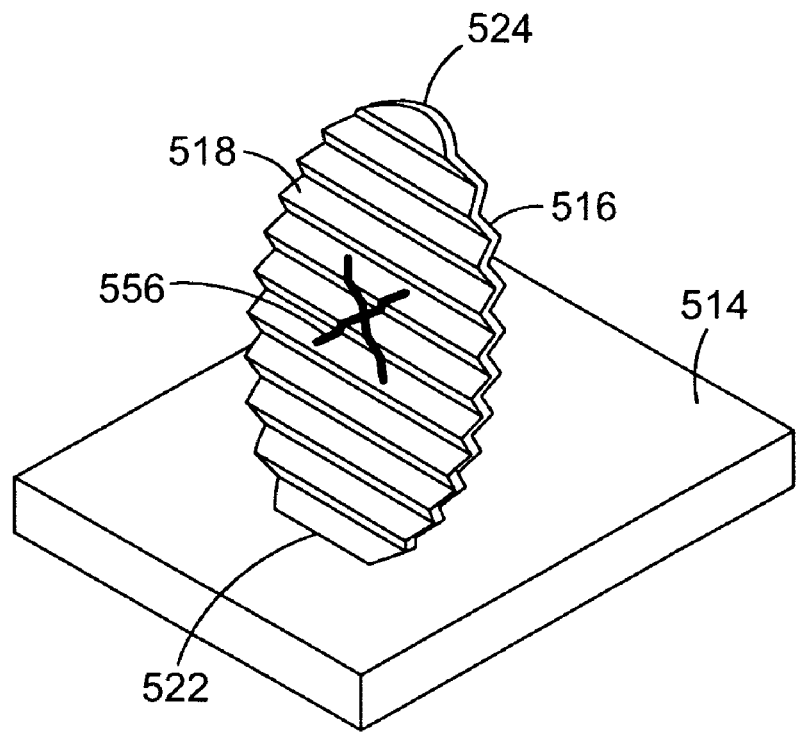
FIG. 5 is a perspective view of an exemplary embodiment of the present invention in an open position displaying an oval shape.

FIG. 5 is a perspective view of an exemplary embodiment of the present invention in an open position displaying an oval shape. As shown in FIG. 5, the expansion chamber 516 affixed to a substrate 514. The expansion chamber 516 comprises a sidewall 518 that defines an enclosed volume. The expansion chamber has a distal end 524 and a proximal end 522.

As shown in FIG. 5, in an open position, the distal end 524 of the expansion chamber 516 is a distance away from the substrate. In the closed position (not shown), the distal end 524 is proximate the substrate 514 and the oval geometric shape is not visible. In other embodiments, the expansion chamber can be configured to form other geometric shapes, including, for example, circles, squares, and rectangles. In yet further embodiments, the expansion chamber is configured to form an emblem or trademark, such as, for example, an apple or a heart.

Also shown in FIG. 5 is a graphic 556 located on the outer surface 528 of the sidewall 518. The graphic 556 can be comprise any text or pictures, including, for example, an emblem, trademark, drawing, or design. As shown in FIG. 5, the graphic 556 is visible in an open position. In the closed position (not shown), the distal end 524 is proximate the substrate 514 and the graphic is not visible.

Figure 6:
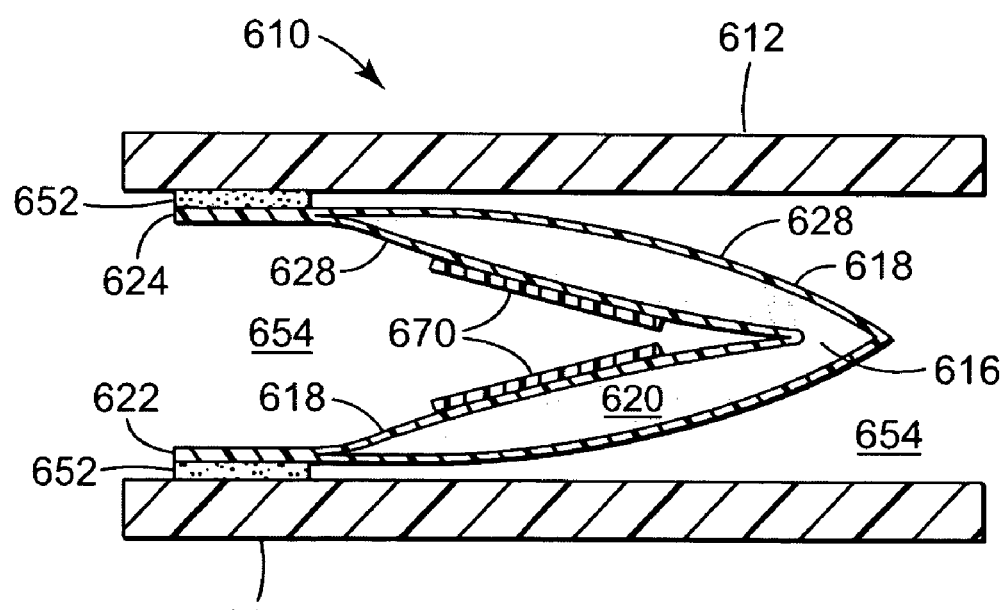
FIG. 6 is a cross-sectional view of an exemplary embodiment having a folding expansion chamber in an open position.

FIG. 6 is a cross-sectional view of an exemplary embodiment having a folding expansion chamber in an open position. The sidewall 618 of the expansion chamber 616 comprises a fold between the distal end 624 and the proximal end 622. The sidewall 618 also comprises a stiffening member 670.

As shown in FIG. 6, the distal end 624 of the expansion chamber 616 has moved away from the substrate 614. The movement of the expansion chamber 616, in turn, has caused the movable member 612 to move away from the substrate 614. In doing so, the outer surface 628 of the sidewall 618 is exposed to ambient air 654 surrounding the cooling assembly 610. In some embodiments, the fold in the sidewall can be used to increase the surface area of the sidewall 618 exposed to ambient air 654 surrounding the cooling assembly. In other embodiments, the fold in the sidewall can be used to control the lateral displacement of the movable member 612 as the expansion chamber is expanded and contracted. In yet further embodiments, the sidewall comprises more than two folds between the distal end 624 and the proximal end 622.

Stiffening members 670 are affixed to at least a portion of the sidewall 618. The stiffening members 670 can be used to control the shape of the expansion chamber 616 as it expands from a closed volume to an open volume. Materials suitable for use as a stiffening member include, for example, metal, glass, ceramic, plastic, or any other material known to those skilled in the art. In some embodiments, the stiffening member is welded to the sidewall. In other embodiments, the stiffening member is affixed with adhesive or a mechanical fastener. Other suitable methods for attaching materials known to those skilled in the art can also be employed.

The level of exposure of the side 618 to the ambient air 654 varies with pressure within enclosed volume 620. When the pressure in the enclosed volume 620 is low (e.g., the heat-dissipating component is operating at low power), the cooling assembly 610 will close and the outer surface 628 of the sidewall 618 will be substantially insulated from ambient air 654. As the pressure in the enclosed volume 620 is increased (e.g., the heat-dissipating component is operating at high power), the cooling assembly 610 will open as shown in FIG. 6 and the outer surface 628 of the sidewall 618 will be exposed to ambient air 654 surrounding the cooling apparatus 610. Likewise, as the pressure in the enclosed volume 620 is decreased (the heat-dissipating component is operating at low power), the cooling assembly 610 will return to the closed position.

It is to be understood that even in the numerous characteristics and advantages of the present invention set forth in above description and examples, together with details of the structure and function of the invention, the disclosure is illustrative only. Changes can be made to detail, especially in matters of shape, size and arrangement of the expansion chamber and methods of use within the principles of the invention to the full extent indicated by the meaning of the terms in which the appended claims are expressed and the equivalents of those structures and methods.

What is claimed is:

1. An article for cooling a heat-dissipating component comprising:
   a substrate;
   an expansion chamber comprising at least one sidewall substantially impermeable to fluid, said sidewall defining an enclosed volume that is expandable between a first volume and a second volume, said sidewall comprising a proximal terminal end affixed to and contacting said substrate, a distal terminal end opposite said proximal end and not contacting said substrate, an inner surface proximate said enclosed volume, and an outer surface opposite said inner surface, wherein said sidewall extends between said proximal terminal end and said distal terminal end; and a quantity of heat transfer fluid disposed within said enclosed volume;

wherein said distal terminal end moves from a first position proximate said substrate to a second position away from said substrate as said enclosed volume expands from said first volume to said second volume.

2. The article of claim 1 further comprising a plurality of said expansion chambers.

3. The article of claim 2 further comprising a movable member affixed to said distal ends of said plurality of expansion chambers.

4. The article of claim 3 further comprising a biasing element cooperating with said substrate and said movable member to force said distal end to be proximate said substrate at said first volume of said expansion chamber.

5. The article of claim 1 wherein said distal end is at least 1 centimeter away from said substrate in said second position.

6. The article of claim 1 wherein said distal end is at least 5 centimeters away from said substrate in said second position.

7. The article of claim 1 wherein said sidewall comprises a corrugated portion.

8. The article of claim 7 wherein said sidewall comprises a geometric shape that is visible when said enclosed volume is at said second volume.

9. The article of claim 7 wherein said sidewall includes an area adaptable for displaying a graphic that is visible when said enclosed volume is at said second volume and concealed when said enclosed volume is at said first volume.

10. The article of claim 9 wherein said graphic comprises a trademark.

11. The article of claim 1 wherein said outer surface is proximate said substrate when said enclosed volume is at said first volume.

12. The article of claim 1 wherein said outer surface is exposed to ambient air surrounding said article when said enclosed volume is at said second volume.

13. The article of claim 1 wherein said expansion chamber is in fluid communication with said heat-dissipating component.

14. The article of claim 1 wherein said heat transfer fluid comprises at least one of a perfluorocarbon, hydrofluorocarbon, hydrofluoroether, and perfluoroketone.

15. The article of claim 1 wherein said sidewall comprises at least one of a polymer film, a metal foil, and a multilayer baffler film.

16. The article of claim 1 wherein said substrate is a computer chassis.

17. An article according to claim 1, wherein said article is a component within a cooling system.

18. An article according to claim 1, wherein said article is a component within a computer.

19. An article for cooling a heat-dissipating component comprising:

a substrate;

a movable member movable between a first position proximate said substrate and a second position away from said substrate;

an expansion chamber comprising a proximal terminal end affixed to and contacting said substrate and a distal terminal end affixed to said movable member and not contacting said substrate, wherein said expansion chamber extends from said proximal terminal end to said distal terminal end; and a quantity of heat transfer fluid having a vapor pressure and disposed within said expansion chamber;

wherein said movable member moves between said first position and said second position as said vapor pressure of said heat transfer fluid changes.

20. The article of claim 19 further comprising a plurality of said expansion chambers.

21. The article of claim 20 wherein said expansion chambers are substantially parallel to one another in said second position.

22. The article of claim 19 wherein said distal end is at least 1 centimeter away from said substrate in said second position.

23. The article of claim 19 wherein said distal end is at least 5 centimeters away from said substrate in said second position.

24. The article of claim 19 wherein said outer surface is exposed to ambient air surrounding said article when said enclosed volume is at said second volume.

25. The article of claim 19 wherein said expansion chamber is in fluid communication with said heat-dissipating component.

26. The article of claim 19 wherein said heat transfer fluid comprises at least one of a perfluorocarbon, hydrofluorocarbon, hydrofluoroether, and perfluoroketone.

27. The article of claim 19 wherein said sidewall comprises at least one of a polymer film, a metal foil, and a multilayer barrier film.

28. The article of claim 19 wherein said movable member is substantially parallel to said substrate in said second position.

29. The article of claim 19 wherein said substrate is a computer chassis.

30. An article according to claim 19, wherein said article is a component within a cooling system.

31. An article according to claim 19, wherein said article is a component within a computer.

32. A method of cooling a heat-dissipating component having heat flux comprising:

providing an expansion chamber comprising a quantity of heat transfer fluid having a vapor pressure, and at least one sidewall that is substantially impermeable to fluid, said sidewall defining an enclosed volume that is expandable between a first volume and a second volume, said sidewall comprising a proximal terminal end affixed to and contacting said substrate, a distal terminal end opposite said proximal terminal end and not contacting said substrate, an inner surface proximate said enclosed volume, and an outer surface opposite said inner surface, wherein said sidewall extends between said proximal terminal end and said distal terminal end;

increasing the vapor pressure of said heat transfer fluid by heating said heat transfer fluid with said heat-dissipating component; and moving said distal terminal end from a first position proximate said substrate to a second position away from said substrate by expanding said enclosed volume from said first volume to said second volume.

33. The method of claim 32 further comprising reducing the vapor pressure of said heat transfer fluid by reducing said heat flux of said heat-dissipating component, and moving said distal end from said second position to said first position by reducing said enclosed volume from said second volume to said first volume.

34. The method of claim 32 wherein said expansion chamber is provided to a heat-dissipating component comprising at least one of a central processing unit and a graphics processing unit.

35. The method of claim 32 further comprising displaying a graphic or geometric shape as said distal end moves from said first position proximate said substrate to said second position.

36. The method of claim 32 wherein said distal end is moved at least 1 centimeter away from said substrate.

* * * * *

UNITED STATES PATENT AND TRADEMARK OFFICE
CERTIFICATE OF CORRECTION

| | | |
|---|---|---|
| PATENT NO. | : 7,581,585 B2 | Page 1 of 1 |
| APPLICATION NO. | : 10/977448 | |
| DATED | : September 1, 2009 | |
| INVENTOR(S) | : Phillip E Tuma | |

It is certified that error appears in the above-identified patent and that said Letters Patent is hereby corrected as shown below:

Title page,
Item [56], References Cited, OTHER PUBLICATIONS, delete "defintion" and insert --definition-- therefor.

Item [74], *Attorney, Agent, or Firm,* after "Johannes P. M. Kusters" insert --; James A. Baker; Daniel D. Biesterveld--.

Column 4,
Lines 65-66, delete "non-segragated" and insert --non-segregated-- therefor.

Column 7,
Line 28, delete "accordian-like" and insert --accordion-like-- therefor.

Line 35, after "chamber" insert --.--.

Column 9,
Line 49, Claim 15, delete "baffler" and insert --barrier-- therefor.

Signed and Sealed this

Twentieth Day of April, 2010

David J. Kappos
*Director of the United States Patent and Trademark Office*